United States Patent [19]
Yamamoto

[11] Patent Number: 6,113,235
[45] Date of Patent: Sep. 5, 2000

[54] EYEGLASSES FRAME HAVING ELASTICALLY DEFORMABLE RIM-TO-TEMPLE JOINTS

[75] Inventor: Toshiyuki Yamamoto, Fukui, Japan

[73] Assignee: KT Optica Inc., Fukui-Ken, Japan

[21] Appl. No.: 09/356,694

[22] Filed: Jul. 2, 1999

[30] Foreign Application Priority Data

Oct. 29, 1998 [JP] Japan .................................. 10-009074

[51] Int. Cl.⁷ ........................................................ G02C 5/16
[52] U.S. Cl. ........................ 351/113; 351/114; 351/153; 351/47; 351/57; 351/126; 16/228
[58] Field of Search .............................. 351/41, 111, 113, 351/114, 119, 121, 153, 124, 126, 129, 47, 57; 16/228

[56] References Cited

U.S. PATENT DOCUMENTS 5,684,559  11/1997  Lin ........................................... 351/153
5,844,655  12/1998  Chang ...................................... 351/113
5,903,332   5/1999  Devercelli .............................. 351/153

*Primary Examiner*—Huy Mai
*Attorney, Agent, or Firm*—Arent Fox Kintner Plotkin & Kahn PLLC

[57] ABSTRACT

Disclosed is an eyeglasses frame comprising a front having two rims connected each other with a bridge and two temples foldably fixed to opposite sides of the front. Each of the temples is connected to one or the other side of the front with at least one coiled spring, which can be changed in diameter or twisted so that the associated temple may be opened wider than the normal opening position, and may be changed vertically in posture. A temple-less auxiliary eyeglasses can be used in combination with the eyeglasses. The temple-less auxiliary eyeglasses have L-shaped catch pieces formed on its opposite sides, which L-shaped catch pieces can be fitted in the coiled springs.

6 Claims, 6 Drawing Sheets

EYEGLASSES FRAME HAVING ELASTICALLY DEFORMABLE RIM-TO-TEMPLE JOINTS

BACKGROUND OF THE INVENTION

1. Field of the Invention

The present invention relates to a metal frame for eyeglasses.

2. Related Arts

A variety of frames have rim-to-temple-joint means on their opposite sides for foldably fixing two temples to the opposite sides of the frame. When one wears the eyeglasses on one's face, the ends of the opposite temples of the eyeglasses are applied to the opposite sides of the head to prevent the eyeglasses from displacing from correct position. If the temples become rickety at their hinges, the eyeglasses cannot fit on one's face, and is apt to be unstable in position.

Usually the opposite temples are yieldingly bent more or less when the eyeglasses are worn on one's face, thereby positively fitting on the head as a counter action. Ceaseless application of pressure on the head, however, will cause unpleasing feeling or discomfort of the head. In an attempt to settle this problem a conventional frame uses spring-installed hinges for connecting temples to its opposite sides. The spring-installed hinge permits the folding and unfolding of an associated temple. It permits the temple to be opened somewhat wider than the normal opening position relative to the front by compressing the spring, which is installed in the hinge structure. Thus, the temples are pushed against the opposite sides of the head at controlled moderate pressure, thus assuring that the eyeglasses are put in correct position all the time.

Advantageously when the temples are opened by force, the spring-installed hinge can be so changed in shape as to prevent any deformation of the front frame, which otherwise, would be caused, and sometimes would lead to lens breakage or the slipping-off of lenses from the front. The spring-installed hinge, however, is complicated in structure, and accordingly the cost involved for manufacturing is high. Also, disadvantageously the spring-installed hinge is easy to break, and the joint size is apt to be large, giving unpleasing sight in appearance.

Referring to FIG. 8, a conventional spring-installed hinge comprises a stationary part B soldered to one or the other joint piece A of the front and a slidable part C having a coiled spring E installed in its cavity. The slidable part C is slidably fitted in a guide slot, which is made in the temple D. The coiled spring E has a headed core rod and loosely wound around the shank of the headed core rod. The head I of the core rod is fixed to its end, and the head I confronts a detent piece G having an engagement projection H on its distal bottom edge. The detent piece G is laid on the temple D with its engagement projection H loosely caught by a groove F, which is made on the temple D just behind the head I of the headed core rod. When the temple D is opened wider beyond the normal opening position, the coiled spring E is compressed so that the head I may abut the detent piece G, thereby applying a counter force to the temple D in the direction in which the temple D returns to the original or normal opening position.

The spring-installed hinge is complicated in structure, and is expensive. Once the spring-installed hinge has been broken, it cannot be repaired with ease. The coiled spring E and its core rod are pushed in the cavity of the slidable part C, and the spring-and-core assembly is retained there in the cavity by allowing the head I to abut the detent piece G. With this arrangement the detent piece G and the coiled spring E cannot be removed. The bottom projection H of the detent piece G is put in the groove F, and the detent piece G is confined in the slidable part C while being pushed by the headed core rod under the influence of coiled spring E, so that the detent piece G may be fixedly held in position. Thus, the detent piece G cannot be removed from the slidable part C with ease, preventing the disassembling and mending of the resilient hinge structure once it has been broken.

The spring-installed hinges permit the opposite temples to be opened wider beyond the normal opening position, thereby causing the opposite temples to be applied to the opposite sides of the head under the resilient influence, thus putting the eyeglasses stably in position. The spring-installed hinges permit the temples to be opened outward in a plane containing two opposite hinges, not permitting the temples to be changed vertically in position. Therefore, the spring-installed hinges cannot allow the temples to be separately changed in vertical position to fit on the head, which is asymmetrical more or less, as for instance, there are two ears, one on each side of the head, at somewhat different levels. As a result one is liable to feel discomfort of the head. Eyeglasses are so adjusted as to fit one's head at an eyeglasses shop. The eyeglasses thus adjusted, however, are liable to reduce its fitness on the head less and less with time.

SUMMARY OF THE INVENTION

One object of the present invention is to provide an eyeglasses frame which is simple in structure, still permitting the automatic or self-adjusting of its posture to fit on the head.

Another object of the present invention is to provide such a self-adjusting eyeglasses frame which permits a temple-less auxiliary eyeglasses to be easily attached to its front.

To attain these objects an eyeglasses frame comprising having two rims connected each other with a bridge and two temples foldably fixed to opposite sides of the front is improved according to the present invention in that each of the temples is connected to one or the other side of the front with at least one coiled spring, which can be changed in diameter or twisted so that the associated temple may be opened wider than the normal opening position, and may be changed vertically in posture.

The eyeglasses frame may have a pair of coiled springs arranged at higher and lower levels and fixed to each side of the frame.

The eyeglasses frame may have first and second elongated wires converging to one common point, the first elongated wire having turns in the form of coiled spring, and a hinge fixed to its end, the temple being connected to the turns via the hinge whereas the second elongated wire having a ball fixed to its end, the ball being fitted in the turns of the first elongated wire.

The eyeglasses frame may have bridge formed with a coiled spring which can be yieldingly deformed in resilient way when subjected to an external force.

An eyeglasses frame comprising a front having two temples foldably fixed to its opposite sides is improved according to the present invention in that the front frame comprises two arch-like sections integrally connected to each other by an intermediate bridge in the form of coiled spring, which can be yieldingly deformed against a force in elastic way.

An eyeglasses frame comprising a front having two temples foldably fixed to its opposite sides is improved according to the present invention in that each of the temples is connected to one or the other side of the front with at least one coiled spring, which can be changed in diameter or twisted so that the associated temple may be opened wider than the normal opening position, and may be changed vertically in posture, and that a temple-less auxiliary eyeglasses has L-shaped catch pieces formed on its opposite sides, which L-shaped catch pieces can be fitted in the coiled springs.

Other objects and advantages of the present invention will be understood from the following description of eyeglasses frames according to some preferred embodiments of the present invention, which are shown in accompanying drawings.

DETAILED DESCRIPTION OF PREFERRED EMBODIMENT

Figure 1:
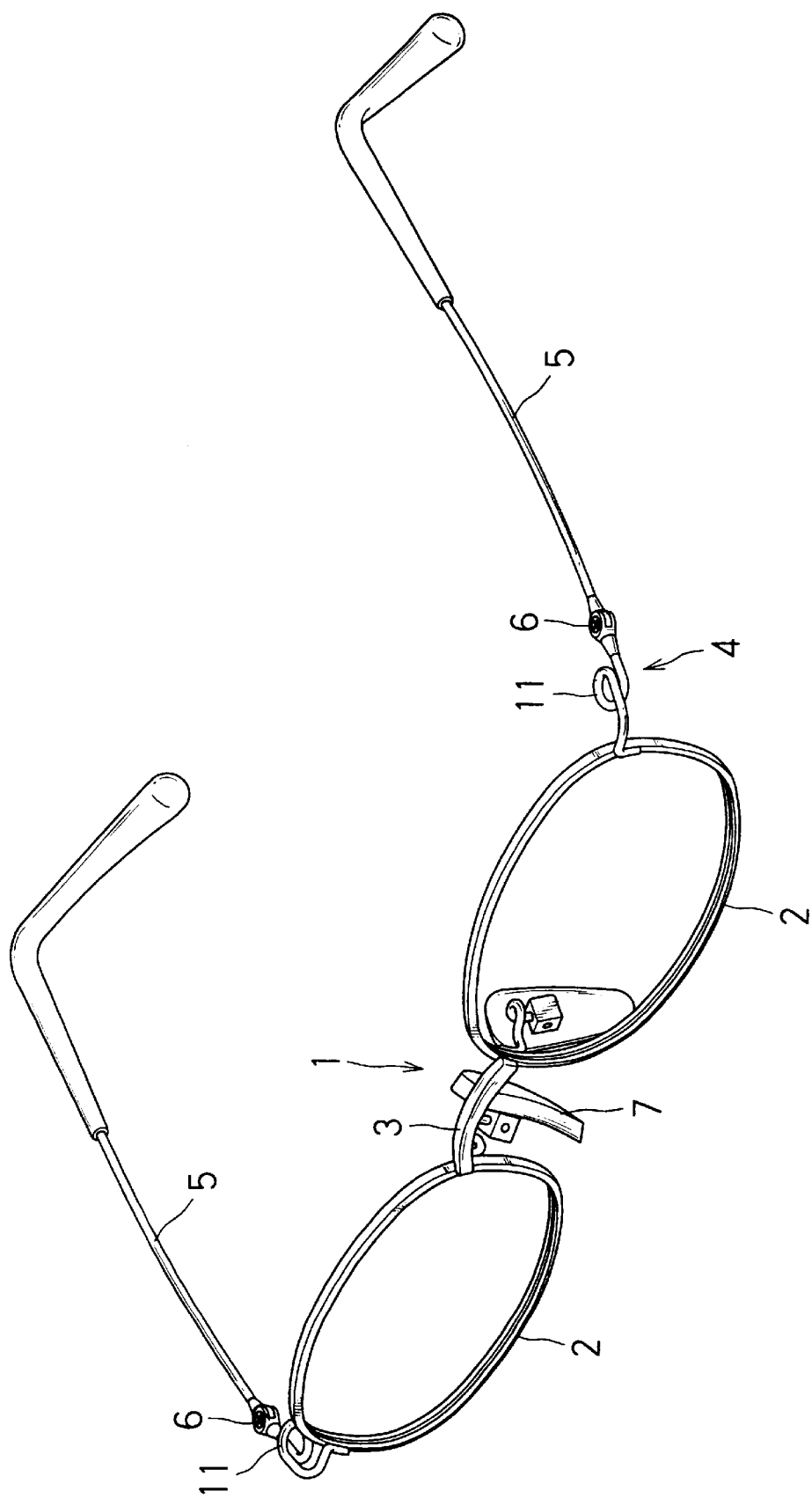
FIG. 1 illustrates an eyeglasses frame according to a first embodiment of the present invention.

Referring to FIG. 1, an eyeglasses frame comprises a front 1 having two rims 2 connected each other with a bridge 3 and two temples 5 foldably fixed to opposite sides of the front. Specifically the rims 2 of the front 1 have joint pieces 11 fixed to their opposite sides, and the temples 5 are foldably fixed to the joint pieces 11 with hinges 6. The rims 2 have nose pads 7 fixed to their confronting inner sides, thereby supporting the frame when the eyeglasses are worn.

An eyeglasses frame according to the present invention is essentially similar to the eyeglasses frame structure described so far, but each of the temples 5 is connected to one or the other side of the front with at least one coiled spring 11 in place of the rim-to-temple joint piece 4, which coiled spring 11 twisted and deformed when an external force is applied thereto. Specifically when the temples 5 are opened wider than the normal opening position in which they extend at right angles relative to the front 1, the coiled springs 11 are changed in diameter so that the temples 5 may be opened wider than the normal opening position without twisting the front 1.

Figure 2A:
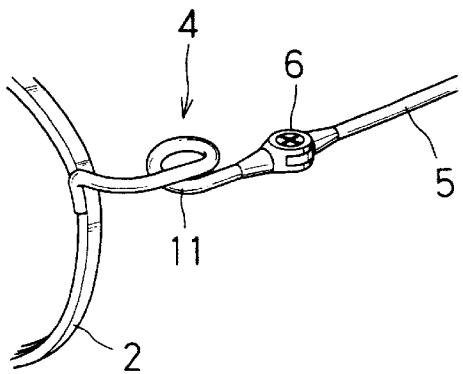
FIGS. 2a to 2d show some examples of rim-to-temple joints.
Figure 2B:
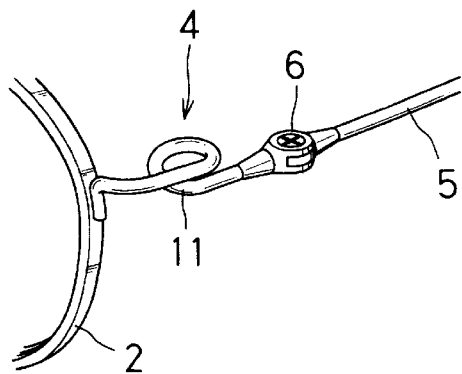
Figure 2C:
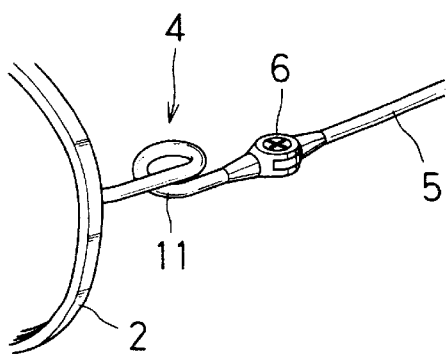
Figure 2D:
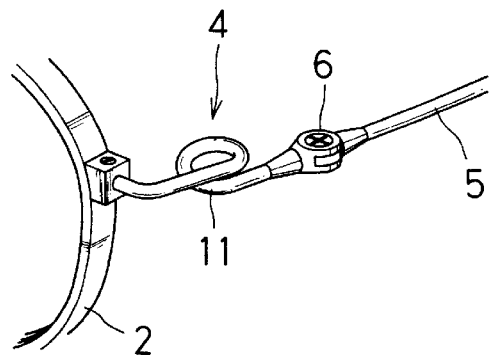

Referring to FIGS. 2a to 2d, a coiled spring 11 is soldered to the rim 2 on its front side as a rim-to-temple joint 4 (see FIG. 2a); a coiled spring 11 is soldered to the rim 2 on its outer side (see FIG. 2b); a coiled spring 11 is soldered to the rim 2 on its rear side (see FIG. 2c); and a cuboid metal 8 is soldered to the rim 2 on its outer side, and a coiled spring 11 is soldered to the cuboid metal 8 (see FIG. 2d). Each coiled spring 11 has a temple 5 foldably fixed thereto via an associated hinge.

Figure 3A:
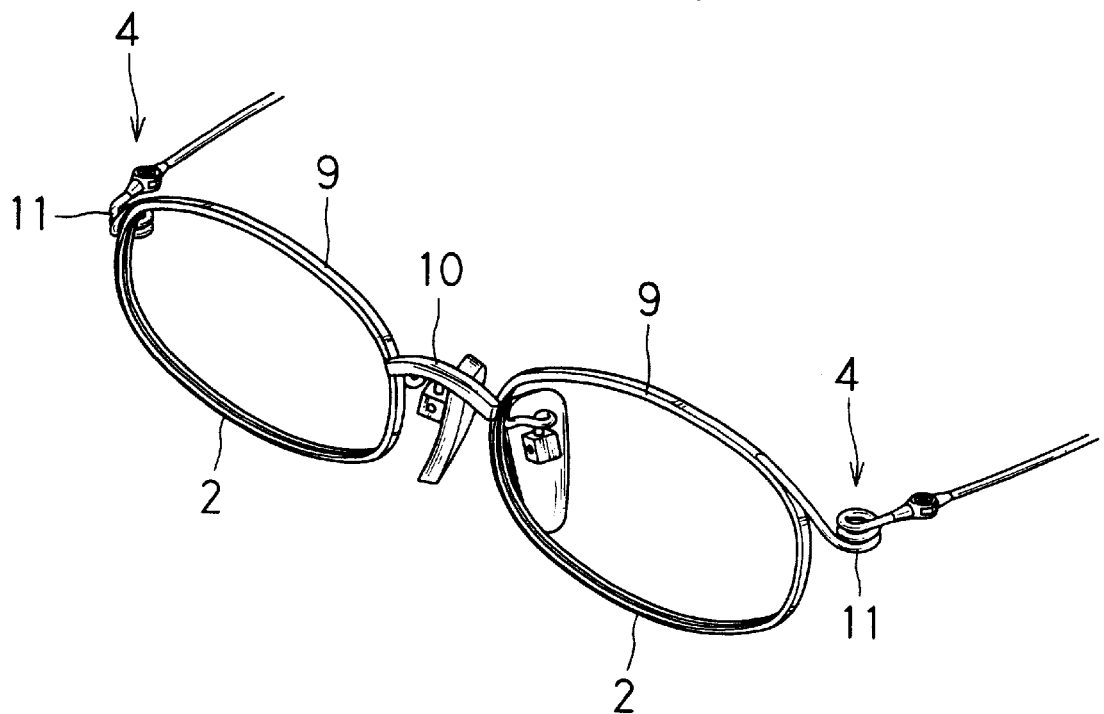
FIGS. 3a and 3b are different eyeglasses frames according to a second embodiment of the present invention.
Figure 3B:
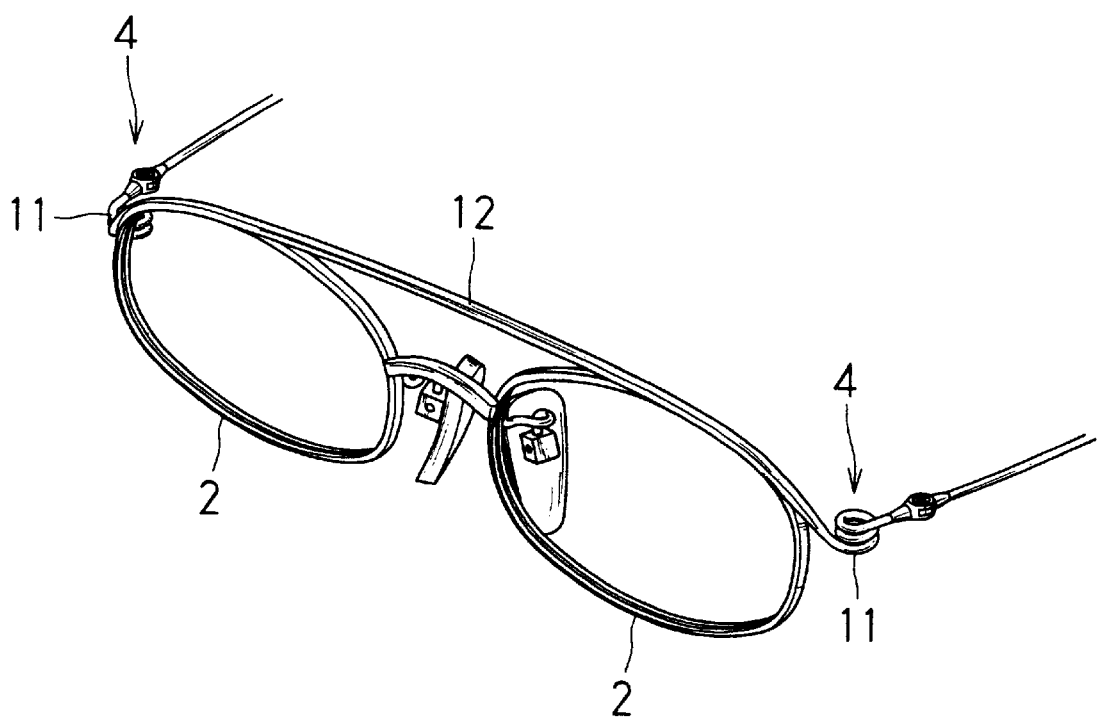

Referring to FIG. 3a, an eyeglasses frame comprises two arch-like sections 9 integrally connected to each other by an intermediate bridge 10. Each arch-like section 9 has a coiled spring 11 integrally connected to its end (functioning as a rim-to-temple joint 4), and a lower rim section 2 soldered to the opposite ends of the arch-like section 9. Referring to FIG. 3b, a traverse 12 is integrally connected to the opposite rims 2 and 2, and the traverse 12 has coiled springs 11 and 11 formed on its opposite ends, which coiled springs function as rim-to-temple joints 4.

Figure 4:
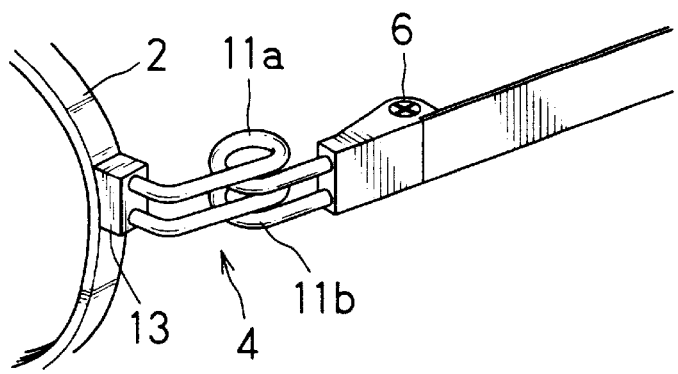
FIG. 4 is an eyeglasses frame according to a third embodiment of the present invention.

Referring to FIG. 4, a pair of coiled springs 11a and 11b make up together a rim-to-temple joint 4. These coiled springs 11a and 11b are made of a fine spring wire, and the paired coiled springs provide a stable support for the temple, and at the same time, they permit the temple to be opened smoothly beyond the normal opening position, and to be inclined up or down.

As shown, one end of each coiled spring 11a or 11b is soldered to a cuboid metal 13, which is soldered to the rim 2. The other end of each coiled spring 11a or 11b is soldered to a hinge 6, by means of which the temple can be folded or unfolded. When the temple is opened wide beyond the normal opening position, the paired coiled springs 11a and 11b are yieldingly increased in diameter, and when the temple is inclined up or down, the paired coiled springs 11a and 11b are twisted accordingly.

Figure 5:
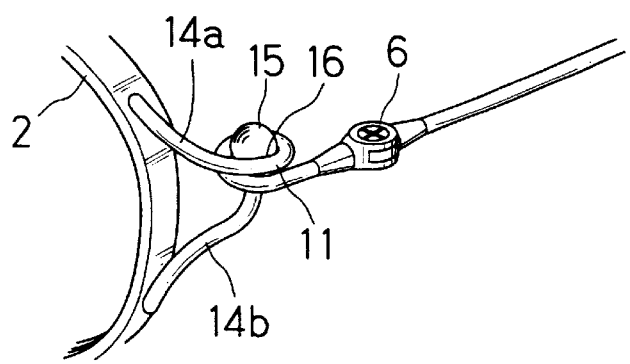
FIG. 5 is an eyeglasses frame according to a fourth embodiment of the present invention.

Referring to FIG. 5, the eyeglasses frame has first and second elongated wires 14a and 14b converging to one common point. The first or upper elongated wire 14a having turns in the form of coiled spring 11, ending with a hinge. The temple is connected to the turns 11 via the hinge. On the other hand, the second or lower elongated wire 14b has a ball 15 fixed to its end. The ball 15 is loosely fitted in the turns 11 of the first or upper elongated wire 14a. There is a small annular gap 16 left between the turns 11 and the ball 15. When the temple is forcedly opened, the upper elongated wire 14a is deformed accordingly, and then, the so deformed elongated wire 14a is supported by the ball 15 of the lower elongated wire 14b.

The paired converging elongated wires 14a and 14b provide a pleasing shape in appearance. In this particular example the upper elongated wire 14a, which is connected to the temple, is supported by the lower elongated wire 14b. To the contrary the lower elongated wire 14b may have turns 11 formed at its end, and the lower elongated wire 14b may be connected to the temple via the coiled spring 11.

Figure 6:
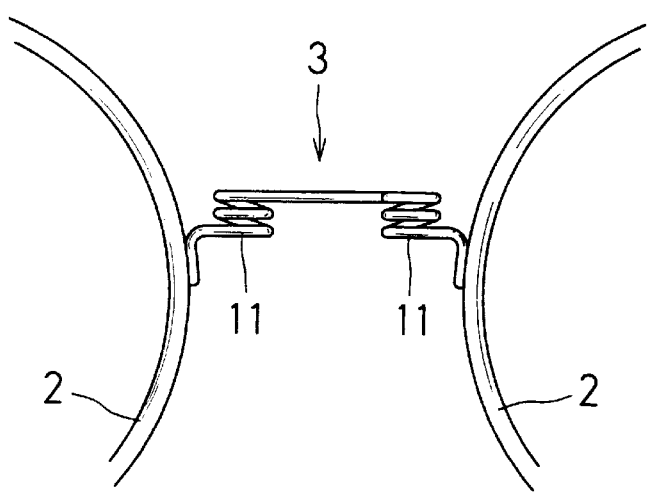
FIG. 6 is an eyeglasses frame according to a fifth embodiment of the present invention.

Referring to FIG. 6, the front comprises two rims 2 and 2 integrally connected to each other by an intermediate bridge 3 in the form of coiled spring 11, which can be yieldingly deformed in resilient way when subjected to an external force. It is not necessary that the eyeglasses frame has coiled springs fixed to its opposite sides as rim-to-temple joints; the wide opening of the temples 5 and 5 beyond the normal opening position is permitted by allowing the intermediate bridge 3 of coiled spring to be yieldingly deformed.

Figure 7:
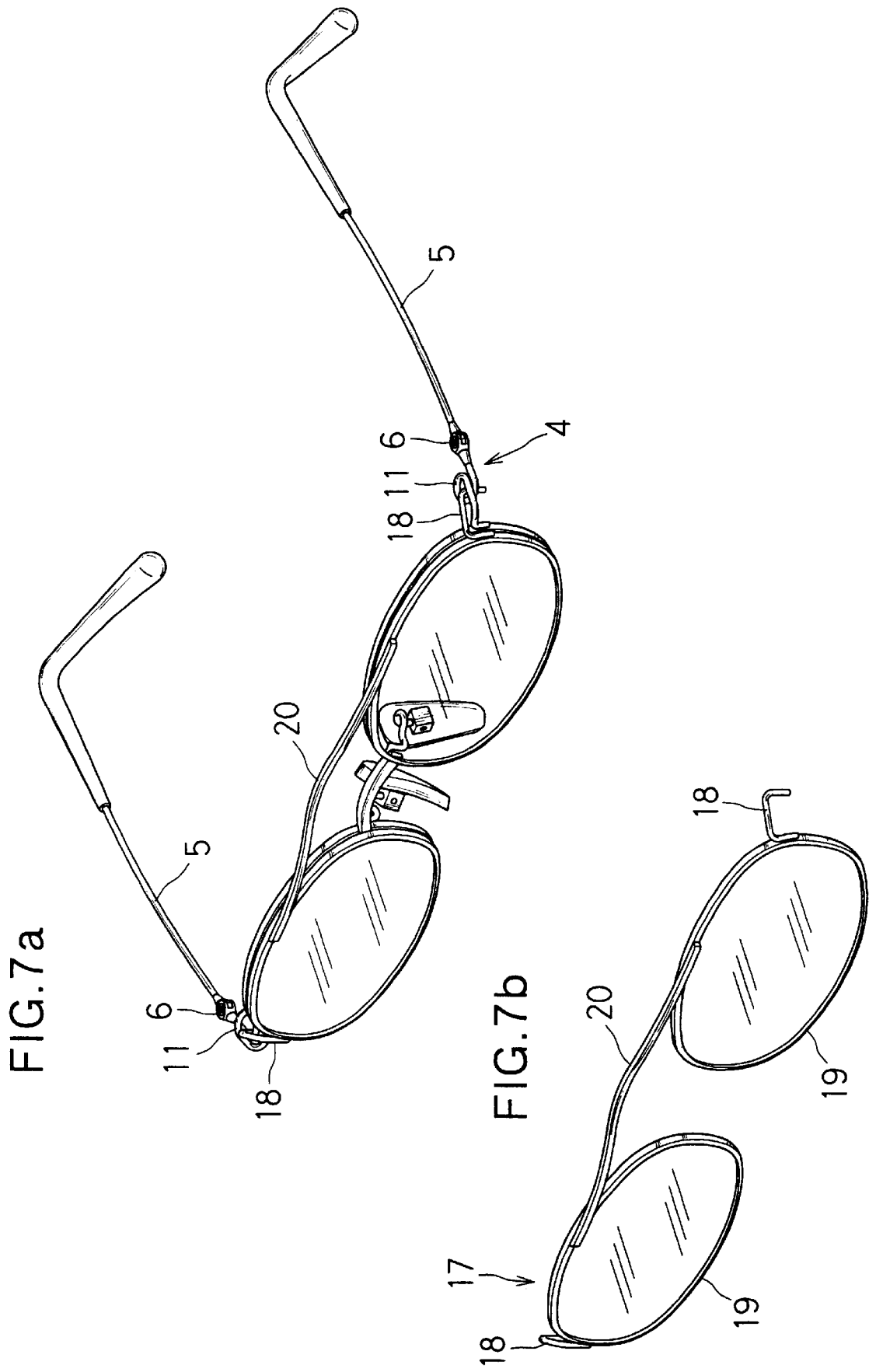
FIGS. 7a and 7b illustrate an eyeglasses frame and a temple-less auxiliary eyeglasses to be attached on the front of the eyeglasses frame.
Figure 8:
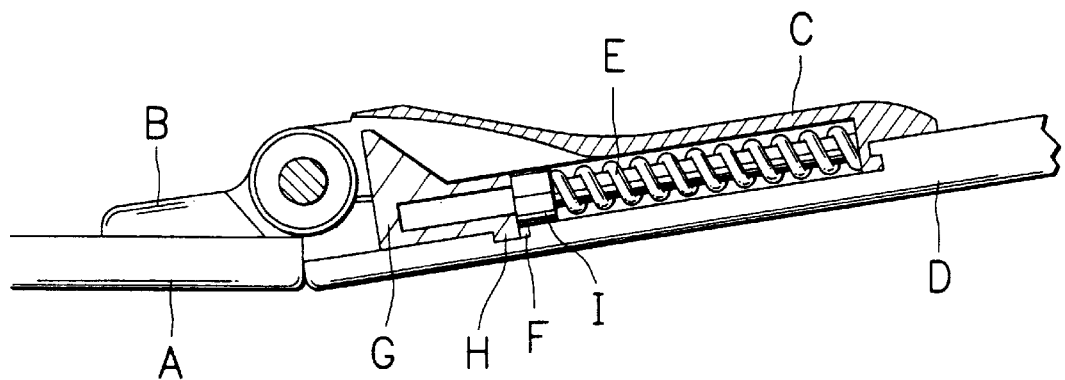
FIG. 8 shows, in section, a conventional spring-installed hinge.

Referring to FIG. 7b, a temple-less auxiliary eyeglasses 17 has two opposite rims 19 connected by a traverse 20, and L-shaped catch pieces 18 soldered to its opposite sides. It has no bridge between its opposite rims 19. Referring to FIG. 7a, an eyeglasses frame has coiled springs 4 on its opposite sides, and two temples connected to the coiled springs 4 via hinges. As shown, the eyeglasses frame has the temple-less auxiliary eyeglasses 17 attached thereto by press-fitting the L-shaped catch pieces 18 in the coiled springs 4. The traverse 20 is elastic enough to allow it to be so yieldingly bent that the L-shaped catch pieces 18 may be easily inserted in the coiled springs 4. Also, the rims 19 has no hook pieces therearound to hang on the eyeglasses frame and accordingly visual field may not be obstructed by such hook pieces. Further, there are no gap between the eyeglasses frame and the auxiliary eyeglasses frame, thereby preventing shine come through therebetween. Furthermore, the temple-less auxiliary eyeglasses 17 is applicable to half-rims type of eyeglasses frame and also to frameless eyeglasses if they have such coiled springs.

As may be understood from the above, an eyeglasses frame according to the present invention permits the elastic deformation of the rim-to-temple joints against a force for the temples to fit on the head, thereby providing a feeling of pleasing fitness in wearing the eyeglasses. The eyeglasses frame responds to the opening of the temples beyond the normal opening position for changing the effective diameter of the coiled springs or twisting to push the temples against the opposite sides of the head at such a moderate pressure that one may feel no discomfort. Such coiled springs used in the eyeglasses frame are simple in structure, still permitting the frame's posture to change most appropriately in response to both of the horizontal and vertical displacements of the temples, and are quite free from any trouble or defect in use. They cannot produce in the rims of the frame any stress strong enough to break lenses when opening the temples wider than the normal opening position. The opposite lenses of the eyeglasses stay in position on the face because the coiled springs are deformed to absorb the stress which otherwise, would be caused in the rims when opening the temples wider than the normal opening position. Thanks to the stable positioning of the lenses relative to the eyes one feels no discomfort even if one wears the eyeglasses for an elongated length of time.

What is claimed is:

1. An eyeglasses frame comprising a front having two rims connected each other with a bridge and two temples foldably fixed to opposite sides of the front, wherein each of the temples is connected to one or the other side of the front with at least one coiled spring, which can be changed in diameter or twisted so that the associated temple may be opened wider than the normal opening position and may be changed vertically in posture.

2. An eyeglasses frame according to claim 1 wherein the frame has a pair of coiled springs arranged at higher and lower levels and fixed to each side of the frame.

3. An eyeglasses frame according to claim 1 wherein the frame has first and second elongated wires converging to one common point, the first elongated wire having turns in the form of coiled spring, and a hinge fixed to its end, the temple being connected to the turns via the hinge whereas the second elongated wire having a ball fixed to its end, the ball being fitted in the turns of the first elongated wire.

4. An eyeglasses frame according to claim 1 wherein said bridge is formed with a coiled spring, which can be yieldingly deformed in resilient way when subjected to an external force.

5. An eyeglasses frame comprising a front having two temples foldably fixed to its opposite sides, wherein the front frame comprises two arch-like sections integrally connected to each other by an intermediate bridge in the form of coiled spring, which can be yieldingly deformed in resilient way when subjected to an external force.

6. An eyeglasses frame comprising a front having two temples foldably fixed to its opposite sides, wherein each of the temples is connected to one or the other side of the front with at least one coiled spring, which can be changed in diameter or twisted so that the associated temple may be opened wider than the normal opening position and may be changed vertically in posture, and that a temple-less auxiliary eyeglasses has "L"-shaped catch pieces formed on its opposite sides, which "L"-shaped catch pieces can be fitted in the coiled springs.

* * * * *